United States Patent [19]

Takahashi et al.

[11] Patent Number: 5,475,658
[45] Date of Patent: Dec. 12, 1995

[54] MAGNETO-OPTICAL RECORDING DEVICE FOR IMPROVING C/N RATIO

[75] Inventors: Akira Takahashi, Nara; Yoshiteru Murakami, Nishinomiya; Kenji Ohta, Kitakatsuragi, all of Japan

[73] Assignee: Sharp Kabushiki Kaisha, Osaka, Japan

[21] Appl. No.: 320,135

[22] Filed: Oct. 7, 1994

Related U.S. Application Data

[63] Continuation of Ser. No. 97,269, Jul. 23, 1993, abandoned, which is a continuation of Ser. No. 738,923, Aug. 1, 1991, abandoned.

[30] Foreign Application Priority Data

Aug. 7, 1990 [JP] Japan .................. 2-210919

[51] Int. Cl.[6] ........................ G11B 13/04
[52] U.S. Cl. ........................ 369/13; 369/110
[58] Field of Search ................. 369/13, 14, 110; 360/114, 59; 428/694, 694 ML, 694 MT, 694 RE; 365/122

[56] References Cited

U.S. PATENT DOCUMENTS

| | | | |
|---|---|---|---|
| 4,733,385 | 3/1988 | Henmi et al. | 369/13 |
| 4,853,912 | 8/1989 | Akasaka et al. | 360/59 |
| 4,878,132 | 10/1989 | Aratani et al. | 360/59 |
| 4,907,211 | 3/1990 | Horimai et al. | 369/13 |
| 4,982,389 | 1/1991 | Nakao et al. | 369/13 |
| 5,091,896 | 2/1992 | Takayama | 369/13 |
| 5,093,816 | 3/1992 | Taniguchi et al. | 369/13 |
| 5,172,364 | 12/1992 | Yoshimoto et al. | 369/13 |
| 5,173,885 | 12/1992 | Iiyori et al. | 369/13 |
| 5,218,581 | 6/1993 | Ohta et al. | 369/13 |

FOREIGN PATENT DOCUMENTS

| | | |
|---|---|---|
| 0243656 | 11/1987 | European Pat. Off. . |
| 0275323 | 7/1988 | European Pat. Off. . |
| 0312143 | 4/1989 | European Pat. Off. . |
| 0321027 | 6/1989 | European Pat. Off. . |
| 2-273351 | 11/1990 | Japan . |

OTHER PUBLICATIONS

Fujita, et al., "A Magneto–Optical Recording Method of Magnetic Field Modulation with Pulsed Laser Irradiation," Japanese Journal of Appl. Physics, vol. 28 (1989) Supp. 28–3, pp. 329–333.

*Primary Examiner*—Scott J. Sugarman
*Assistant Examiner*—Tan Dinh
*Attorney, Agent, or Firm*—David G. Conlin; Kevin J. Fournier

[57] ABSTRACT

A magneto-optical recording device having a light source and external magnetic field applying apparatus, which records information on a magneto-optical recording medium with a magnetic field modulation method. The device has a controller which stops the irradiation of a light beam when switching the direction of applying external magnetic field during recording. This allows an area where information is recorded with a low external magnetic field to be smaller, and thereby achieving reproduced signal of improved quality.

9 Claims, 7 Drawing Sheets

MAGNETO-OPTICAL RECORDING DEVICE FOR IMPROVING C/N RATIO

This is a continuation of application Ser. No. 08/097,269 filed Jul. 23, 1993 and now abandoned, which is a continuation of Ser. No. 07/738,923 filed on Aug. 1, 1991 and now abandoned.

FIELD OF THE INVENTION

The present invention relates to a magneto-optical recording device for recording information on a recording medium, such as magneto-optical disk, card and tape.

BACKGROUND OF THE INVENTION

Magneto-optical recording media as rewritable high-capacity optical memory are the focus of attention, and magneto-optical disks have been utilized. Information is recorded on a magneto-optical recording medium by raising the temperature of the recording medium with the irradiation of laser light and applying an external magnetic field thereto. Meanwhile, the information is reproduced by irradiating laser light on the magneto-optical recording medium and detecting the rotating direction of the polarization plane of the reflected light.

Magneto-optical recording is roughly divided into two types: optical intensity modulation method and magnetic field modulation method. With the optical intensity modulation method, the intensity of laser light is modulated while keeping the external magnetic field having a uniform direction and strength. Here, as the direction of external magnetic field is uniform and bits are recorded along one direction, before recording the direction of magnetization needs to be opposite to the direction of recording. Meanwhile, with the magnetic field modulation method, the direction of external magnetic field is switched while keeping the laser light of a fixed intensity.

In this method, new information can be recorded while erasing previously recorded information. Therefore, the erasing of the previously recorded information is unnecessary, in practice shortening the time taken for recording. Accordingly, a lot of researches on this method have been carried out in recent years.

When the direction of magnetic field is switched, the magnetic field strength once becomes "0", thereby deteriorating the strength momentary. Thus, an area having information recorded with this low magnetic field does not have a sufficiently uniform magnetization direction. Therefore, reproduced signals from these areas have deteriorated quality. To restrain this, the period during which magnetic field has a low strength needs to be as short as possible and the magnetization direction needs to be switched as quick as possible.

However, normally external magnetic field generating means is made of an electromagnet composed of a coil wound around a ferrite core, and the magnetization direction is switched in accordance with the direction of a current flowing through the coil. Besides, a current having high frequencies hardly goes through the coil due to the coil's self-inductance. Therefore, in order to switch the magnetization direction at a high speed, a high voltage needs to be generated at both ends of the coil, preventing the manufacture of more compact device consuming less power.

SUMMARY OF THE INVENTION

An object of the present invention is to provide a magneto-optical recording device which permits reproduced signals of improved quality.

Another object of the present invention is to provide a more compact and lightweight magneto-optical recording device consuming less power.

In order to achieve the above objects, a magneto-optical recording device of the present invention has a light source for irradiating a light beam on a recording medium, external magnetic field applying means and control means. In the device, the light source irradiates the light beam and raises the temperature of the recording medium, the external magnetic field applying means applies an external magnetic field in one direction out of two directions to record information, and the control means controls the light source to stop irradiating the light beam when the external magnetic field applying means switches the direction of applying magnetic field.

In this configuration, when the direction of applying external magnetic field is switched, i.e. when the magnetic field strength becomes lower, the light source stops irradiating light beam. Therefore, information is always recorded by the application of external magnetic field having a sufficient strength, yielding reproduced signals of improved quality.

According to the configuration, the area on the recording medium wherein information is recorded with a low external magnetic field becomes smaller. Thus, even in case of using a recording medium, which presents deteriorated recording characteristics in relation to low external magnetic field, reproduced signals of acceptable quality are obtained.

Besides, reproduced signals of acceptable quality will also be obtained with the use of external magnetic field applying means which requires a long time to switch the direction of applying external magnetic field. These characteristics enable the level of applied voltage to the external magnetic field applying means to be lower than the level of voltage in conventional devices, contributing to the manufacture of a more compact and lightweight device consuming less power.

When a conventional recording medium and external magnetic field applying means are used, needless to say, the present invention yields reproduced signals of better quality in comparison to the conventional devices.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
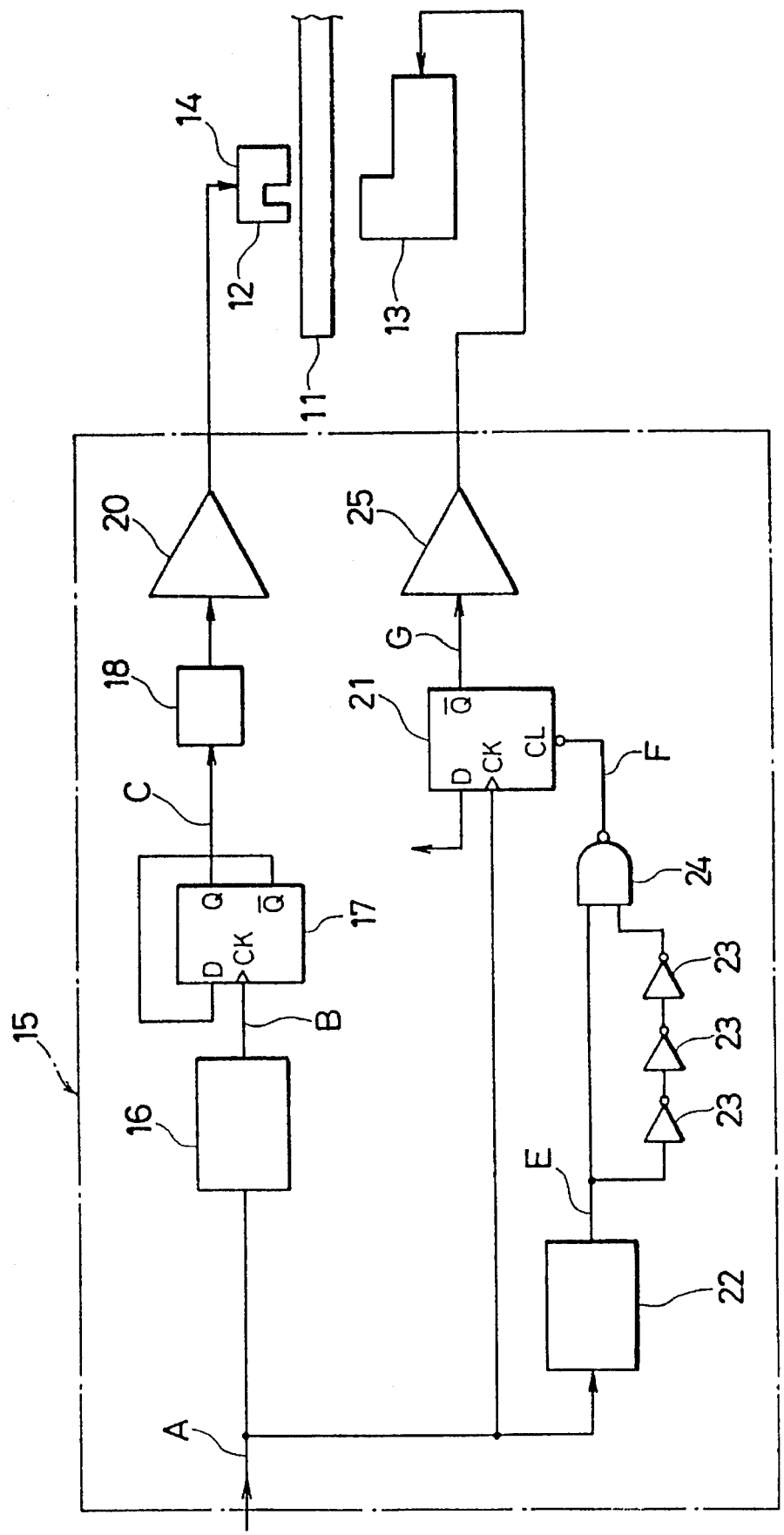
FIG. 1 illustrates the schematic structure of a magneto-optical recording device according to one embodiment of the present invention.

Referring to FIG. 1 and FIG. 2, the following will describe one embodiment of the present invention.

As shown in FIG. 1, a magneto-optical recording device for recording information on a magneto-optical disk 11 (recording medium) has a magnetic head 12 as external magnetic field applying means and an optical head 13. Here, the magneto-optical disk 11 is composed of a substrate, a vertically magnetized film as recording film, a reflective film and protective film although not divided precisely in the figure.

The magnetic head 12 is integral with a slider 14 which is capable of sliding over the magneto-optical disk 11, and has the ability to fly. It is pushed towards the disk side by a suspension (not shown), and flies with the rotation of the magneto-optical disk 11. The optical head 13 has an optical system composed of a light source, for example semiconductor laser, and an objective lens (not shown).

This magneto-optical recording device has a recording signal processing circuit 15 composed of a first circuit and a second circuit. According to a recording signal A, the first circuit and the second circuit generate signals to be supplied to the magnetic head 12 and to the optical head 13, respectively. The first circuit has a delay circuit 16, a flip-flop 17, an attenuator 18 and an amplifier 20.

Figure 2A:
FIG. 2 (a) to FIG. 2 (f) are time charts respectively showing the changes of signal at each section of the magneto-optical recording device of FIG. 1.
Figure 2B:
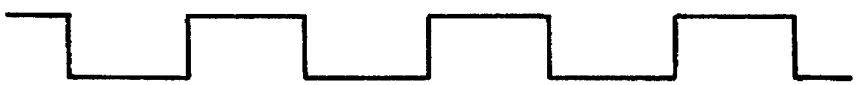

For example, the recording signal A shown in FIG. 2(a) is inputted to the delay circuit 16, and then a signal B (see FIG. 2(b)) is transmitted after a delay of a specified period.

Figure 2C:
Figure 2D:

The signal B is inputted to a clock input terminal CK of the flip-flop 17, and an output from an inverse output terminal $\overline{Q}$ is inputted to a data input terminal D. Accordingly, from an output terminal Q of the flip-flop 17 is outputted an output C as shown in FIG. 2(c). The leading edge of the recording signal A corresponds to the edge of a recording bit. An output signal C of the flip-flop 17 is attenuated by the attenuator 18, and then amplified by the amplifier 20. An output of the amplifier 20 is supplied to the magnetic head 12. Regarding the amplifier 20, when the original data contains no DC component like 4/5 modulation, 8/10 modulation and EFM modulation, an RF amplifier may be used, while when the original data contains a DC component like 2/7 modulation, a DC amplifier may be used.

The second circuit has a flip-flop 21 serving as control means, a delay circuit 22, three inverters 23, a NAND circuit 24 and an amplifier 25.

Figure 2E:

The recording signal A is inputted to a clock input terminal CK of the flip-flop 21, while a signal of a high level is regularly inputted to a data input terminal D thereof. The recording signal A is also inputted to the delay circuit 22. An output signal E (see FIG. 2(d)) delayed a predetermined time in the delay circuit 22 is outputted to one of the input terminals of the NAND circuit 24. In the meantime, the output signal E is delayed a predetermined time and inverted by three inverters 23, and then supplied to the other input terminal of the NAND circuit 24. Then, the NAND circuit 24 transmits an output signal F as shown in FIG. 2(e), and it is inputted to a clear input terminal CL of the flip-flop 21. The delay circuit 22 determines a period during which the optical head 13 stops the irradiation of light beam.

Figure 2F:

An output G from an inverse output terminal $\overline{Q}$ of the flip-flop 21, shown in FIG. 2(f), is amplified by the amplifier 25 and then supplied to the optical head 13.

As is clear from FIG. 2(c) and FIG. 2(f), the signal to be supplied to the optical head 13 becomes a low level immediately before the signal to be supplied to the magnetic head 12 is inverted. In other words, the light source of the optical head 13 is turned off when inverting the magnetic field of the magnetic head 12, so the irradiation of light beam from the light source is stopped.

This arrangement causes the area, wherein information is recorded with a low external magnetic field, to be smaller, permitting reproduced signals of improved quality.

This point will be discussed more specifically in reference to FIG. 3 to FIG. 5 and FIG. 8.

Figure 3:
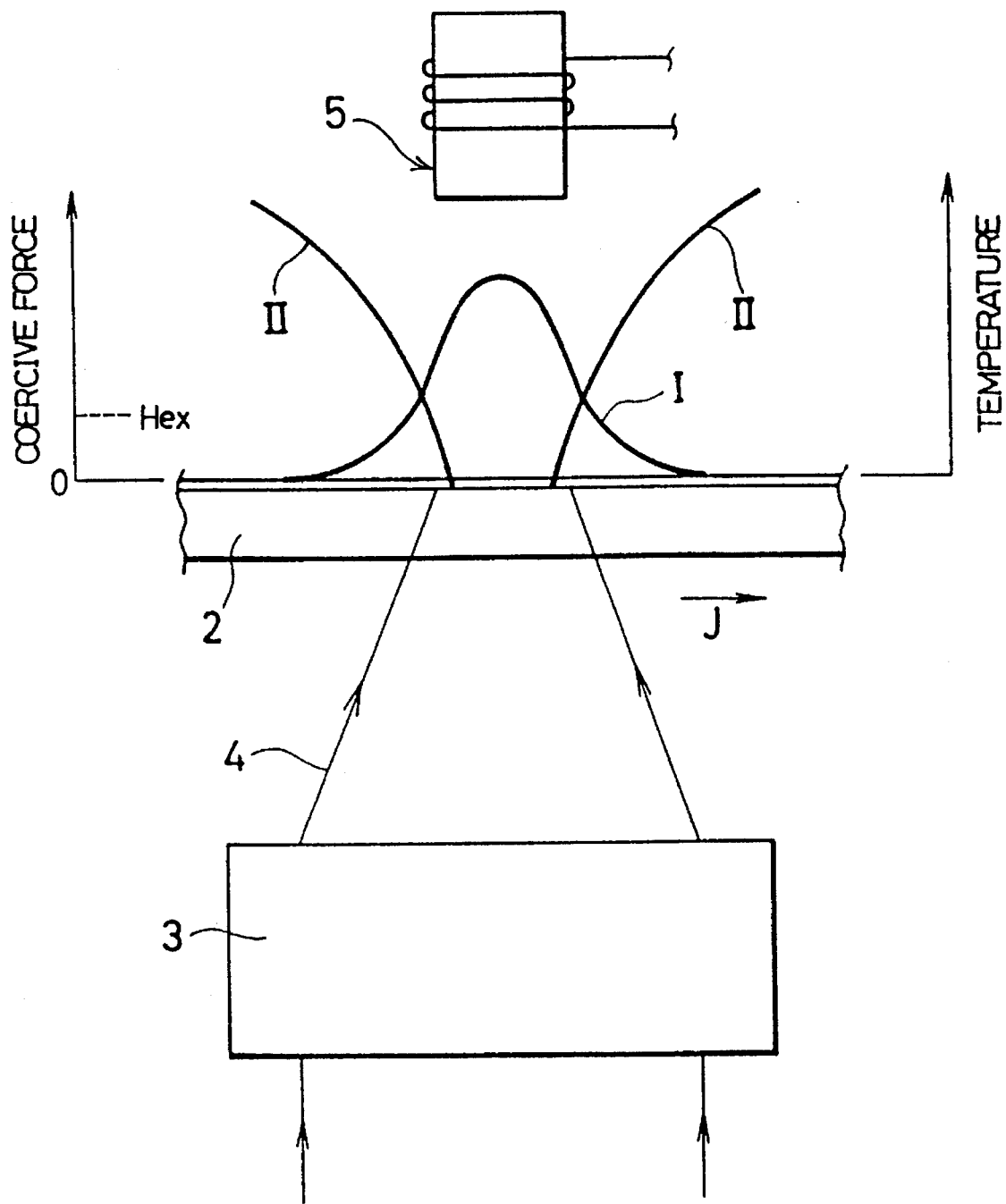
FIG. 3 is an explanatory view illustrating the magneto-optical recording device, and the distribution of temperature and coercive force on a recording medium.

As shown in FIG. 3, the recording film 1 of the magneto-optical disk, composed of a vertically magnetized film, is normally formed on the substrate 2. Information is recorded through the following steps: irradiating a light beam 4 on the recording film 1 through the objective lens 3 while moving (rotating) the recording film 1 in the direction of arrow J; and simultaneously applying an external magnetic field upwards or downwards with the external magnetic field applying means 5 composed of the magnetic head, etc. Curved line I in FIG. 3 illustrates the temperature distribution on the recording film 1 with respect to the irradiation of the light beam 4. Meanwhile, curved line II shows the coercive force distribution on the recording film 1. The coercive force becomes substantially "0" near the center of the light beam 4, heated to the vicinity of the Curie point. The more distant from the center of the light beam 4, i.e. the lower the temperature becomes, the greeter the coercive force becomes. When an external magnetic field $H_{ex}$ from the external magnetic field applying means 5 exceeds a coercive force $H_c$, information is recorded on the recording film 1.

Figure 4:
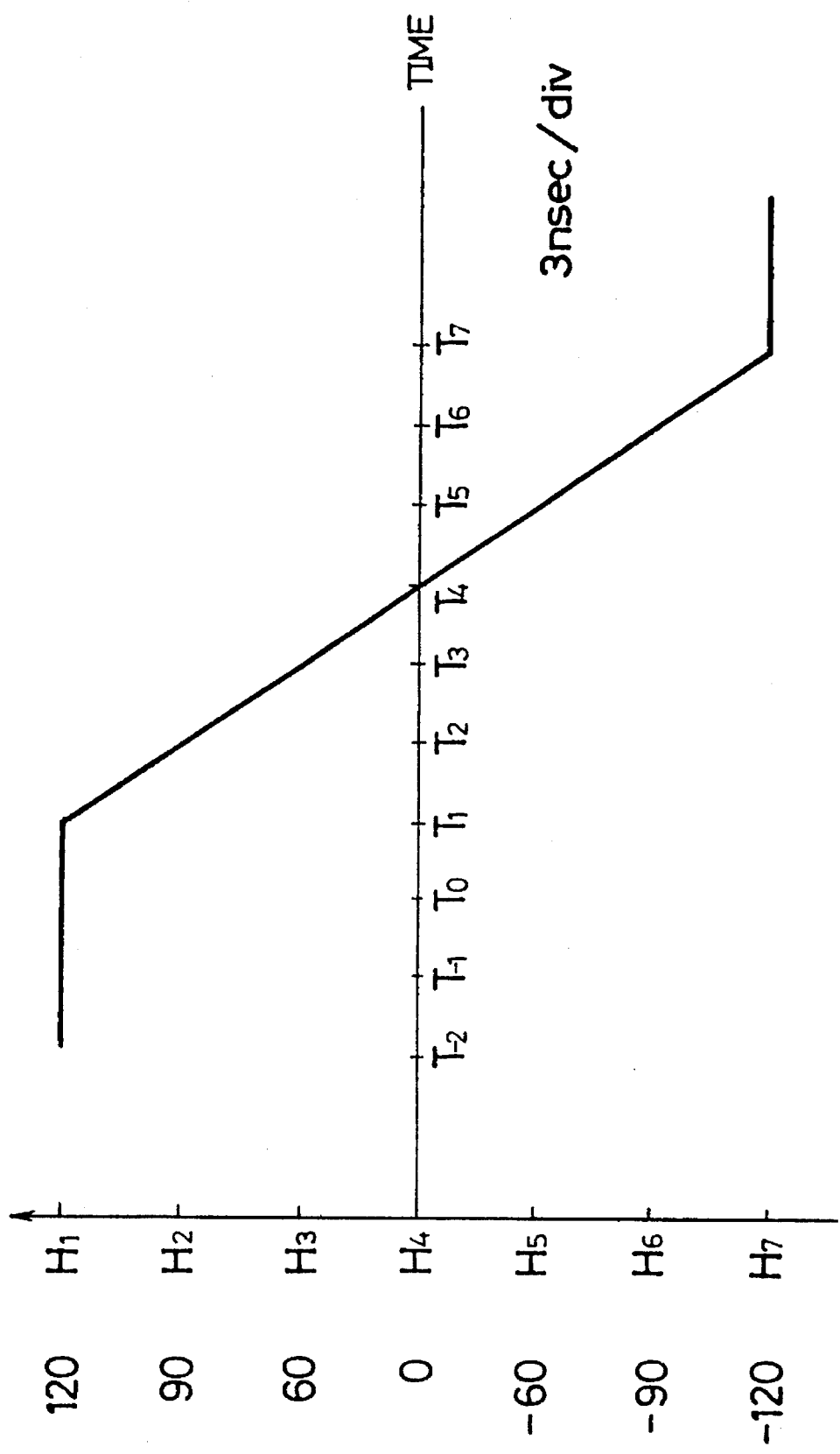
FIG. 4 is an explanatory view illustrating how external magnetic field applying means switches the direction of applying external magnetic field.

FIG. 4 shows the relationship between the external magnetic field and the elapse of time when the direction of the external magnetic field is switched by the external magnetic field applying means 5. Here, it is defined that the external magnetic field before switching is $H_1$ (for example, 120 [Oe]), the switching starts from Time $T_1$, the coercive force reaches "0" at time $T_4$, and the switching ends at time $T_7$ where the coercive force marks $H_7$ (for example, −120 [Oe]), wherein one scale on the horizontal line, for example, the division between $T_0$ and $T_1$ is 3 [nsec].

Figure 8:
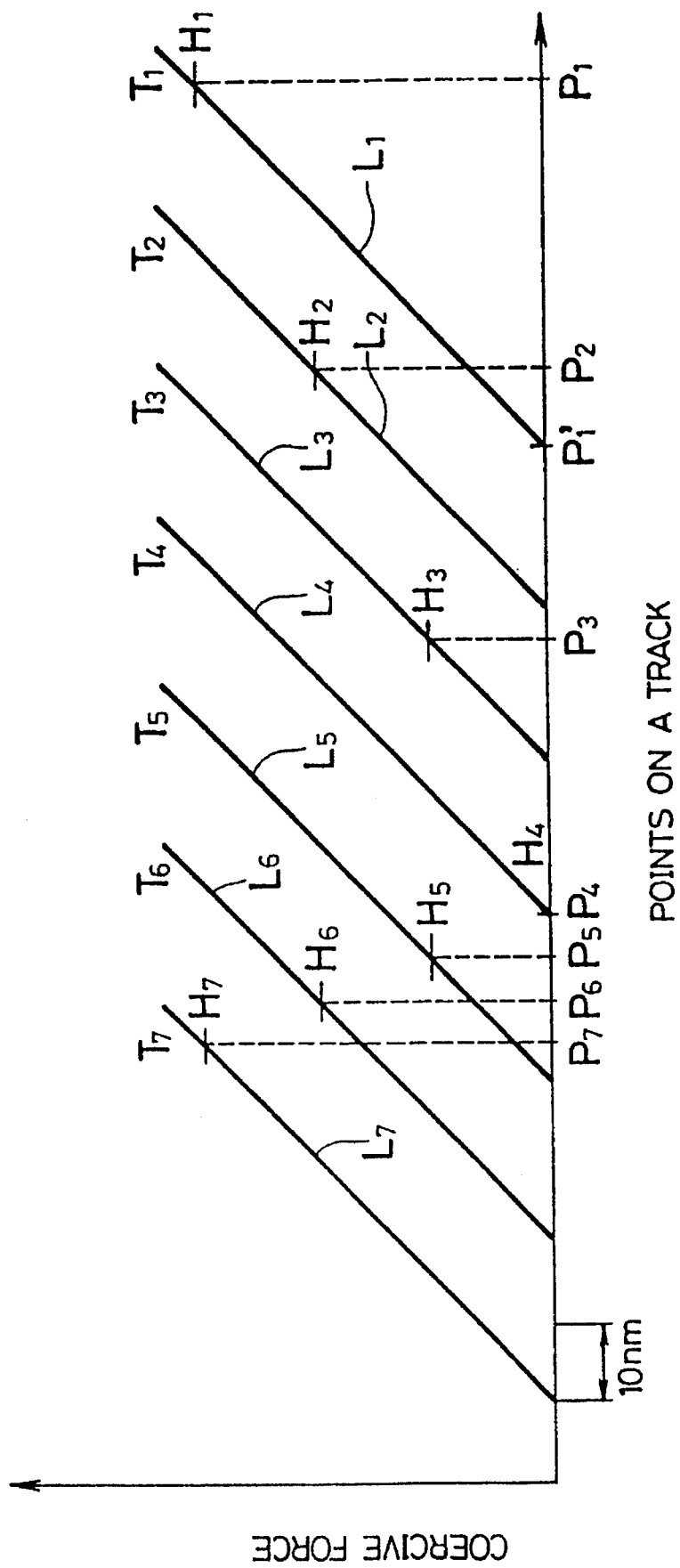
FIG. 8 is an explanatory view illustrating the coercive force distribution on a recording medium used with a conventional magneto-optical recording device.

FIG. 8 shows the relationship between points on track (horizontal line, expressed in nanometer) and the coercive force (vertical line) on the recording film 1 of a conventional magneto-optical recording device by taking time as parameter. In the figure, the track on the recording film 1 moves towards the right and relatively the light beam 4 moves towards the left. At this time, for example at time $T_1$, the coercive force is zero at all the points located left side the crossing point $P_1'$ of a straight line $L_1$ and the horizontal line, while the coercive force at point located right side of the crossing point $P_1'$ becomes higher towards the far right as approximately shown by the straight line $L_1$. This is due to the fact that at the points located right side the crossing point $P_1'$ the temperature progressively falls as the extremities of the light beam 4 are approached from the center.

In the meantime, according to FIG. 4, the external magnetic field at time $T_1$ is $H_1$. At time $T_1$, information is recorded in an area on the recording film 1 where the external magnetic field $H_1$ exceeds the coercive force $H_c$. Briefly, a recording bit is formed in an area located left side the crossing point $P_1$ on the track of the external magnetic field $H_1$ and the straight line $L_1$.

Similarly, at time $T_2$ to time $T_7$, recording bits are formed in areas located left side the crossing points $P_2$ to $P_7$ of straight lines $L_2$ to $L_7$ and external magnetic fields $H_2$ to $H_7$, respectively. Further, as time elapses, the straight lines $L_2$ to $L_7$ indicating coercive force shifts towards the left in the figure at a constant speed equal to the relative moving speed of the light beam 4 with respect to the recording film 1.

In view of points $P_2$ to $P_6$ with respect to $H_2$ to $H_6$ of lower external magnetic fields, the distance between $P_2$ and $P_4$ before the external magnetic field is inverted is considerably long compared to the distance between $P_4$ and $P_6$ after the external magnetic field is inverted. This is due to the straight lines $L_1$ to $L_7$ which slope upwards towards the right in the figure. Thus, the quality of reproduced signals is more deteriorated as the area, for example, the area between $P_2$ and $P_4$ wherein information is recorded with a low external magnetic field becomes larger.

In order to solve this problem, the present invention arranges the irradiation of the light beam 4 to be stopped when switching the direction of applying external magnetic field. For example, the timing; stopping the irradiation may be controlled as described below.

Figure 5:
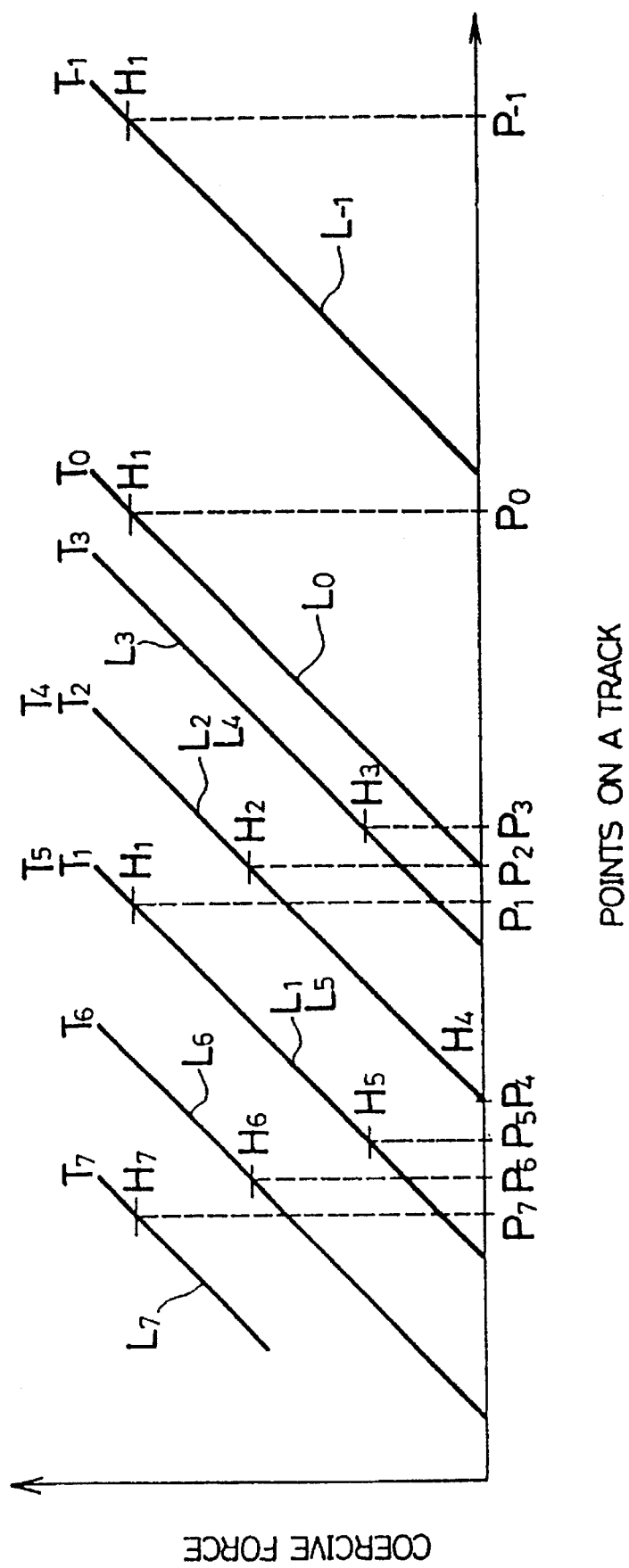
FIG. 5 is an explanatory view illustrating the coercive force distribution on the recording medium used with the magneto-optical recording device of the present invention.

Assuming that the irradiation of the light beam 4 is stopped from time $T_{-2}$. In this case, the temperature of the recording film 1 starts decreasing from time $T_{-2}$. As a result, as shown in FIG. 5, the straight lines $L_{-1}$, $L_0$ and $L_1$ shift towards the center of the light beam 4, i.e. towards the left in the figure, at a speed faster than the relative moving speed of the light beam 4.

When the irradiation of the light beam 4 resumes at time $T_1$, the straight lines $L_2$ and $L_3$ shift towards the right in the figure with a rise in temperature of the recording film 1. After time $T_3$ the steady state is kept, and the straight lines $L_4$ and $L_5$ start shifting towards the left in the figure at a constant speed equal to the relative moving speed of the light beam 4 with respect to the recording film 1.

In this case, information is recorded in an area ranging from $P_3$ to $P_6$ with low external magnetic fields $H_2$ to $H_6$, and the area is considerably small compared to an area ranging from $P_2$ to $P_6$ shown in FIG. 8. Especially, in the case of using the conventional device, information is recorded in a recording area ranging from $P_2$ to $P_4$ (FIG. 8) with low external magnetic field before inverting external magnetic field, while in the present invention information in recorded in a reduced area ranging from $P_3$ to $P_4$ (FIG. 5). This enables the quality of reproduced signals to improve.

An experiment was carried out to verify that above recording method achieved reproduced signals of improved quality. The following will explain the details and results of the experiment.

Figure 6:
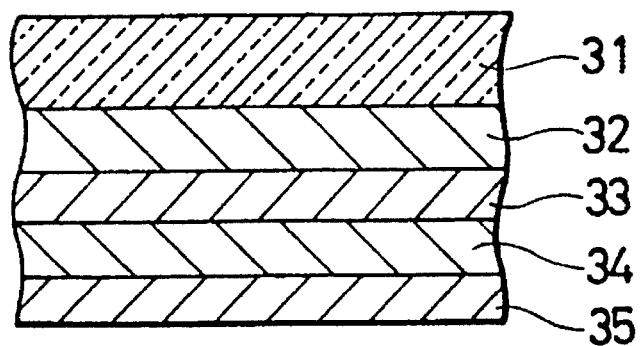
FIG. 6 is a schematic vertical cross sectional view illustrating a magneto-optical disk used in experiments carried out to test the effects of the present invention.

A magneto-optical recording medium of four-layer structure, having a DyFeCo film that is a thin film made of an alloy of rare earth elements and transition metals as magnetic layer and a reflective film, was used in the experiment. The structure is illustrated in FIG. 6.

More specifically, the magneto-optical recording medium has a transparent substrate 31 made of a polycarbonate plate having 86 mm in outer diameter, 15 mm in inner diameter and 1.5 mm in thickness.

An AlN film 32 that is a first transparent dielectric film of 80 nm in thickness is formed on the transparent substrate 31. A DyFeCo film 33 that is a thin film made of an alloy of rare earth elements and transition metals with 20 nm in thickness is formed on the AlN film 32. An AlN film 34 that is a second transparent dielectric film of 25 nm in thickness is formed on the DyFeCo film 33. An Al film 35 that is a reflective film with 30 nm in thickness is formed on the AlN film 34.

With the use of the above magneto-optical recording medium and by varying the composition of the DyFeCo film 33, the recording and reproducing characteristics of the recording method of the present invention were measured (separately from this application, the applicant of the present invention filed an application relating to the composition of DyFeCo as magneto-optical recording medium, see Japanese Publication for Unexamined Patent Application No. 2-273351/1990).

Figure 7:
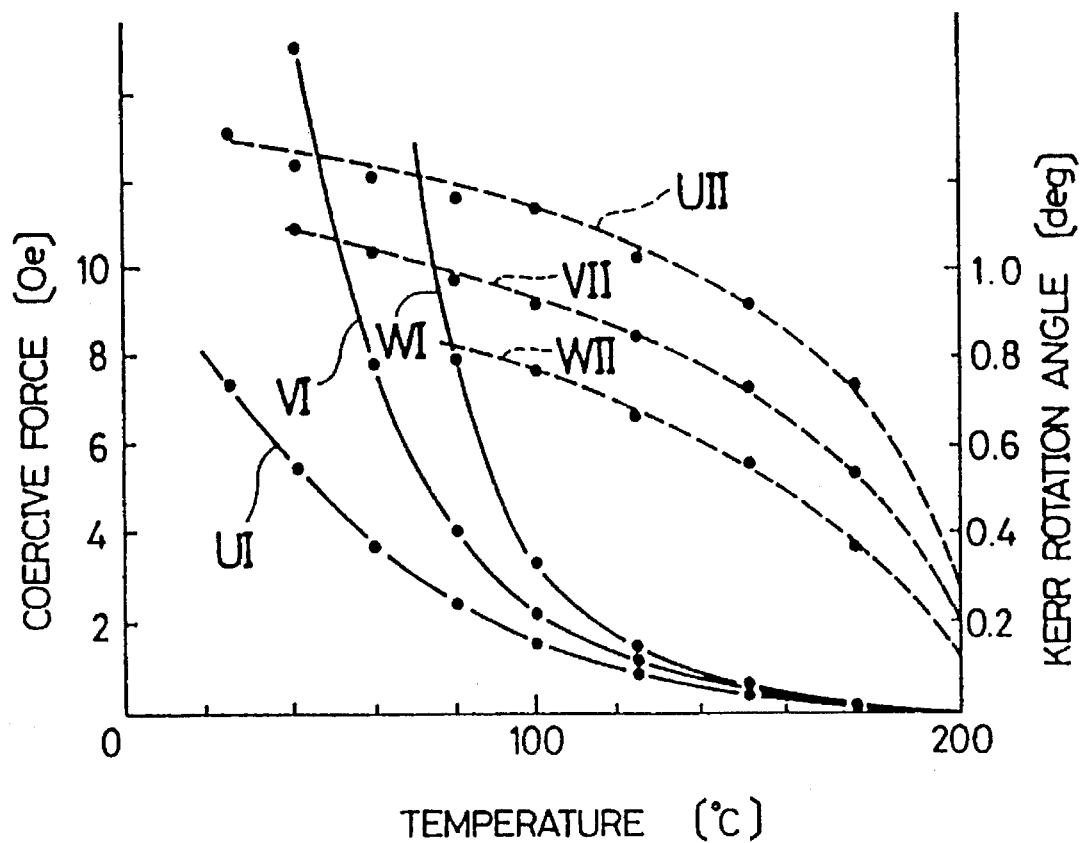
FIG. 7 is a graph illustrating the dependence of the coercive force and the Kerr rotation angle upon temperature according to the above experiments.

First, three media U, V, W were prepared. The media were respectively produced from substances, $Dy_x(Fe_yCo_{(1-y)})_{(1-x)}$ constituting the DyFeCo film 33, wherein the amount X of Dy varies from each other. Table 1 and FIG. 7 show the Curie temperature $T_c$, and the dependence of coercive force and Kerr rotation angle upon temperature, measured with respect to the media U, V and W. The amount Y of Fe and Co was set at 0.78. The composition of the medium V is arranged such that room temperature equals a magnetic compensation temperature. As for the medium U, it has a composition containing an increased amount of transition metals compared to the medium V (hereinafter referred to as $TM_{rich}$). Meanwhile, the composition of the medium W contains a relatively large amount of rare earth element compared to the medium V (hereinafter referred to as $RE_{rich}$).

TABLE 1

| Medium | Amount of Dy [atm %] = 100X | $T_c$ [°C.] |
| --- | --- | --- |
| U | 21.2 | 220 |
| V | 22.5 | 210 |
| W | 23.7 | 205 |

As is clear from Table 1, the Curie temperature $T_c$ drops as the amount of the rare earth elements increases. Curved lines UI, VI, and WI in FIG. 7 respectively represent the dependence of the coercive force of the media U, V and W upon temperature. According to this figure, the coercive force decreases as the temperature of the medium comes close to the Curie temperature and also as the amount of Dy decreases. In the meantime, curved lines UII, VII and WII in FIG. 7 show the dependence of the Kerr rotation angle of the respective media U, V and W upon temperature. The Kerr rotation angle becomes smaller as the temperature of the recording medium rises and also as the amount of Dy increases.

The optical head used for measuring the recording and reproducing characteristics has a semi-conductor laser as light source whose wavelength is 780 nm and an objective lens whose numerical aperture is 0.55. The magnetic head of flying type is installed opposite to the optical head with the magneto-optical recording medium between. This head requires about 20 nsec to 30 nsec for switching magnetic field from positive to negative or vise versa.

The recording and reproducing characteristics with respect to the above three types of media U, V and W shown in Table 1 and FIG. 7 were measured under the following conditions. Here, the above optical head and magnetic head were used, the magneto-optical recording medium was controlled to rotate at a linear velocity of 6.3 m/sec and the recording frequency was set such that the length of a recording bit was equal to 0.9 μm.

The same experiments were carried out with respect to the conventional optical intensity modulation recording and magnetic field modulation recording to compare them with the present invention. In the optical intensity modulation recording, laser light for recording is modulated while using a unidirectional external magnetic field, in which overwriting is infeasible. Meanwhile, in the magnetic field modulation recording, external magnetic field is modulated while using recording laser light of a uniform intensity.

The results of the experiments are shown in Table 2.

TABLE 2

(external magnetic field $H_e = \pm 100$ Oe)

| Medium | C/N (dB) | | |
|---|---|---|---|
| | Conventional Light Modulation | Conventional Magnetic Field Modulation | Present Invention |
| U | 49.8 | 45.0 | 49.8 |
| V | 48.5 | 47.2 | 49.2 |
| W | 47.0 | 46.1 | 48.2 |

FIG. 2 shows the comparison in the quality, C/N, of reproduced signals between respective recording methods and recording media, wherein the external magnetic field $H_e$ equals ±100 [Oe].

The recording laser power, laser pulse length, phase of external magnetic field and of laser pulse in recording were set so as to yield the maximum C/N with the respective recording methods and the recording media. In the optical intensity modulation recording, the C/N reached the maximum level when the recording laser power was about 5.5 [mW]. Meanwhile, in the magnetic modulation recording and the recording method of the present invention, the C/N was the maximum level when the recording laser power was about 6.5 [mW].

Table 2 indicates that the recording method of the present invention achieves an improved C/N with respect to any media U, V and W compared to the conventional recording of magnetic field modulation. Particularly, the C/N was significantly improved when the medium U of $TM_{rich}$ composition was used. This means that the $TM_{rich}$ composition can be used for recording medium when the recording method of the present invention is employed. In addition, this yields very favorable characteristics even when the strength of external magnetic field is relatively low, around ±100 [Oe].

According to the above results, it can be said that the recording method of the present invention has the following effects: (i) achieving an improved C/N compared to the one in the conventional recording method of magnetic field modulation; (ii) permitting a wider range of composition of the recording medium compared to the one in the conventional recording method of magnetic field modulation; and (iii) enabling the recording to be performed with an external magnetic field whose strength is lower than the strength of an external magnetic field used in the conventional magnetic field modulation. Consequently, the magnetic head is not required to have a high performance, thereby permitting the manufacture of a more compact device consuming less power.

Besides, the magneto-optical recording device of the present invention also has a reproducing function; it reproduces information from the magneto-optical disk 11. As is generally known, in order to reproduce information, the optical head 13 irradiates laser light on the magneto-optical disk 11 and detects the rotation of the polarization plane of the reflected light.

In this embodiment, the explanation is made by using the magneto-optical disk 11 as recording medium, however, the present invention is also applicable to other media, such as magneto-optical cards and tapes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording device comprising a recording medium made of a rare-earth transition-metal composition wherein the ratio of the transition metal to the rare earth is greater than the ratio thereof for rare-earth-transition-metal compositions in which the compensation temperature thereof is equal to room temperature;

a light source for irradiating a light beam on said recording medium;

external magnetic field applying means for recording information on the recording medium by applying an external magnetic field to an area on the recording medium, the direction of the magnetic field varying in accordance with the information to be recorded and the temperature of the area being raised with the irradiation of the light beam; and control means for detecting when said external magnetic field applying means is instructed to switch directions, and, when such detection is made, controlling said light source to stop irradiating the light beam for a time period before said external magnetic field applying means switches the direction of applying the external magnetic field.

2. The magneto-optical recording device as defined in claim 1, wherein said control means comprising:

a delay circuit to which a recording signal is inputted;

three inverters to which an output from said delay circuit is consecutively inputted;

a NAND circuit having two input terminals, the output from said delay circuit being inputted one of the input terminals, an output from said inverters being inputted the other input terminal;

a flip-flop having a clock input terminal, a data input terminal and a clear input terminal, the recording signal being inputted to said clock input terminal, a signal of a high level being regularly inputted to said data input terminal, an output from said NAND circuit is being inputted to said clear input terminal; and an amplifier to which an output from an inverse output terminal of said flip-flop is inputted, and wherein the irradiation of the light beam is stopped according to a signal from said amplifier.

3. The magneto-optical recording device as defined in claim 2, further comprising:

a delay circuit to which the recording signal is inputted;

a flip-flop having a clock input terminal, an inverse output terminal and data input terminal, an output of said delay circuit being inputted to said clock terminal, an output of said inverse output terminal being inputted said data input terminal;

an attenuator to which an output from an output terminal of said flip-flop is inputted; and an amplifier to which an output from said attenuator is inputted, wherein a direction of applying external magnetic field is switched according to a signal from said amplifier.

4. A method for recording information on a recording medium with the use of a magneto-optical recording device having a light source for irradiating a light beam on the recording medium and external magnetic field applying means for recording information on the recording medium by applying an external magnetic field on an area of the recording medium, the temperature of the recording medium being raised with the irradiation of the light beam, comprising the steps of:

using a recording medium made of a rare-earth-transition-metal composition wherein the ratio of the transition metal to the rare earth is greater than the ratio thereof for rare-earth-transition metal compositions in which the compensation temperature thereof is equal to room temperature;

irradiating the light beam on the recording medium by said light source;

applying the external magnetic field to the recording medium;

switching a direction of applying the external magnetic field;

detecting when said external magnetic field applying means is instructed to switch the direction of applying the external magnetic field; and when such detection is made, stopping the irradiation of the light beam for a time period before said external magnetic field applying means switches the direction of applying the external magnetic field.

5. A magneto-optical recording device as defined in claim 1 wherein said recording medium is made of a DyFeCo material.

6. A magneto-optical recording device as defined in claim 5 wherein the material of said recording medium is $Dy_{0.21}(Fe_{0.78}Co_{0.22})_{0.79}$.

7. A method as defined in claim 4 wherein the step of using a recording medium comprises using a recording medium made of a DyFeCo material.

8. A method for recording information on a recording medium with the use of a magneto-optical recording device having a light source for irradiating a light beam on the recording medium and external magnetic field applying means for recording information on the recording medium by applying an external magnetic field on an area of the recording medium, the temperature of the recording medium being raised with the irradiation of the light beam, comprising the steps of:

using a recording medium made of a rare-earth-transition-metal composition wherein the ratio of the transition metal to the rare earth is greater than the ratio thereof for rare-earth-transition metal compositions in which the compensation temperature thereof is equal to room temperature;

irradiating the light beam on the recording medium by said light source;

applying the external magnetic field to the recording medium;

switching a direction of applying the external magnetic field; and stopping the irradiation of the light beam when switching the direction of applying the external magnetic field;

wherein the material of said recording medium is $Dy_{0.21}(Fe_{0.78}Co_{0.22})_{0.79}$.

9. The method of claim 4 in which a magnetic field modulation technique is used.

* * * * *